(12) United States Patent
Chang

(10) Patent No.: US 10,740,922 B2
(45) Date of Patent: Aug. 11, 2020

(54) IMAGE DATA PROCESSING METHOD, ELECTRONIC DEVICE AND STORAGE MEDIUM

(71) Applicant: BEIJING KINGSOFT INTERNET SECURITY SOFTWARE CO., LTD., Beijing (CN)

(72) Inventor: Chifeng Chang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 80 days.

(21) Appl. No.: 15/972,297

(22) Filed: May 7, 2018

(65) Prior Publication Data
US 2019/0005674 A1 Jan. 3, 2019

(30) Foreign Application Priority Data
Jun. 30, 2017 (CN) .......................... 2017 1 0531848

(51) Int. Cl.
*G06T 7/70* (2017.01)
*G06T 7/20* (2017.01)
(Continued)

(52) U.S. Cl.
CPC .............. *G06T 7/70* (2017.01); *G06K 9/0061* (2013.01); *G06K 9/00248* (2013.01); *G06T 7/20* (2013.01);
(Continued)

(58) Field of Classification Search
CPC .... G06T 7/70; G06T 7/73; G06T 7/74; G06T 7/75; G06T 7/20; G06T 7/207; G06T 7/215; G06T 7/246; G06T 7/579; G06T 2207/20201; G06K 9/00248; G06K 9/00221; G06K 9/00228; G06K 9/00241; G06K 9/00255; G06K 9/00268; G06K 9/00281; G06K 9/00288; G06K 9/00295;
(Continued)

(56) References Cited

U.S. PATENT DOCUMENTS 5,148,477 A * 9/1992 Neely ..................... G06T 7/254
382/107
5,802,220 A * 9/1998 Black ................. G06K 9/00248
382/100
(Continued)

*Primary Examiner* — Dwayne D Bost
*Assistant Examiner* — Stephen M Brinich
(74) *Attorney, Agent, or Firm* — Osha Liang LLP

(57) ABSTRACT

Embodiments of the present disclosure provide an image data processing method, an image data processing apparatus, an electronic device and a storage medium. The image data processing method includes: during a preset first collecting time period, collecting regularly a plurality of first user images corresponding to a target user, and extracting first part image data in each of the plurality of first user images; recording position information of the first part image data in each of the plurality of first user images on a display interface; if it is determined that the target user is at a preset stable state, performing a statistical processing to obtain a total movement times corresponding to the first part image data within a preset statistical time period; and if the total movement times reaches a preset threshold, performing an image processing on second part image data on a current display interface.

15 Claims, 8 Drawing Sheets during a preset first collecting time period, a plurality of first user images corresponding to a target user are collected regularly, and first part image data in each of the plurality of first user images is extracted — S101 position information of the first part image data in each of the plurality of first user images on a display interface is recorded — S102 if it is determined that the target user is at a preset stable state according to the position information of the first part image data in each of the plurality of first user images on the display interface, a statistical processing is performed to obtain a total movement times corresponding to the first part image data within a preset statistical time period — S103 if the total movement times corresponding to the first part image data reaches a preset threshold, an image processing is performed on second part image data on a current display interface — S104

(51) Int. Cl.
*G06T 7/246* (2017.01)
*G06K 9/00* (2006.01)
*G06K 9/32* (2006.01)

(52) U.S. Cl.
CPC ...... *G06T 7/246* (2017.01); *G06K 2009/3291* (2013.01); *G06T 2200/24* (2013.01); *G06T 2207/10016* (2013.01); *G06T 2207/30201* (2013.01)

(58) Field of Classification Search
CPC ........... G06K 9/00302; G06K 9/00308; G06K 9/00315; G06K 9/00335
USPC ....... 382/291, 286, 289, 100, 107, 236, 232; 396/153
See application file for complete search history.

(56) References Cited

U.S. PATENT DOCUMENTS

| | | | |
|---|---|---|---|
| 10,383,531 B2* | 8/2019 | Lai | A61B 5/7278 |
| 2003/0185424 A1* | 10/2003 | Sato | G06K 9/00255 382/118 |
| 2014/0307926 A1* | 10/2014 | Murakami | G06T 7/20 382/107 |
| 2016/0086342 A1* | 3/2016 | Yamaji | G06T 11/60 382/103 |
| 2019/0046057 A1* | 2/2019 | Lai | G06K 9/00234 |

* cited by examiner during a preset second collecting time period, a plurality of second user images corresponding to the target user are collected regularly, and first part image data in each of the plurality of second user images are extracted — S201 a first part vertical-axis distance corresponding to the first part image data in each of the plurality of second user images is computed to obtain a plurality of first part vertical-axis distances — S202 a maximum first part vertical-axis distance and a minimum first part vertical-axis distance are selected from the plurality of first part vertical-axis distances, and an absolute value of a difference between the maximum first part vertical-axis distance and the minimum first part vertical-axis distance is computed, and a third difference ratio of the absolute value of the difference to the maximum first part vertical-axis distance is computed — S203 if the third difference ratio is greater than a preset third ratio threshold, a movement times corresponding to the first part image data is increased by one, and the movement times corresponding to the first part image data during a next second collecting time period is detected continuously, so as to perform the statistical processing to obtain the total movement times corresponding to the first part image data within the preset statistical time period, in which the preset statistical time period is greater than the second collecting time period — S204

Fig. 3

IMAGE DATA PROCESSING METHOD, ELECTRONIC DEVICE AND STORAGE MEDIUM

CROSS-REFERENCE TO RELATED APPLICATIONS

This application is based on and claims a priority to Chinese Patent Application No. 201710531848.0, filed on Jun. 30, 2017, the entire contents of which are incorporated herein by reference.

FIELD

The present disclosure relates to the computer application field, and more particularly to an image data processing method, an image data processing apparatus, an electronic device and a storage medium.

BACKGROUND

With the rapid development of mobile communication technology, an increasing number of users install more and more applications (for example, applications with a facial beautification function such as Beautycam, My Cam and the like) on their user terminals. These applications often have a facial beautification function and a function for fine adjusting facial organs. If a precise adjustment is needed for the current image data, the user may need to adjust the image processing effect of the current image data manually via a manual control on the terminal interface.

For example, when the user makes a live video or selfie, the current collected image data may be processed with an initial image processing, i.e., the use terminal may perform a fine adjustment on the facial organs in the image data, such that the user may view the fine-adjusted image processing result immediately on a preview interface. However, by adopting this fine adjustment to process the image data, only overall fine adjusted processing effect can be presented.

DISCLOSURE

The present disclosure provides an image data processing method and an image data processing apparatus.

A first aspect of embodiments of the present disclosure provides an image data processing method, including: during a preset first collecting time period, collecting regularly a plurality of first user images corresponding to a target user, and extracting first part image data in each of the plurality of first user images; recording position information of the first part image data in each of the plurality of first user images on a display interface; when it is determined that the target user is at a preset stable state according to the position information of the first part image data in each of the plurality of first user images on the display interface, performing a statistical processing to obtain a total movement times corresponding to the first part image data within a preset statistical time period; and when the total movement times corresponding to the first part image data reaches a preset threshold, performing an image processing on second part image data on a current display interface.

A second aspect of embodiments of the present disclosure provides an image data processing apparatus, including: a collecting and extracting module, configured to collect regularly a plurality of first user images corresponding to a target user during a preset first collecting time period, and to extract first part image data in each of the plurality of first user images; a position recording module, configured to record position information of the first part image data in each of the plurality of first user images on a display interface; a times counting module, configured to perform a statistical processing to obtain a total movement times corresponding to the first part image data within a preset statistical time period when it is determined that the target user is at a preset stable state according to the position information of the first part image data in each of the plurality of first user images on the display interface; and an image processing module, configured to when the total movement times corresponding to the first part image data reaches a preset threshold perform an image processing on second part image data display interface.

A third aspect of embodiments of the present disclosure provides an electronic device. The electronic device includes a processor and a memory, wherein the processor is connected to the memory, the memory is configured to store executable program codes for causing the electronic device to perform the image data processing method according to the first aspect of embodiments of the present disclosure; and the processor is configured to perform the image data processing method according to the first aspect of embodiments of the present disclosure.

A fourth aspect of embodiments of the present disclosure provides a computer storage medium having stored therein a computer program including instructions that, when executed by a processor of a device, cause the processor to perform the image data processing method according to the first aspect of embodiments of the present disclosure.

A fifth aspect of embodiments of the present disclosure provides a computer program product having instructions that, when executed by a processor of a device, cause the processor to perform the image data processing method according to the first aspect of embodiments of the present disclosure.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

FIG. 3 is a schematic diagram of a method for performing statistical processing to obtain a movement times according to an embodiment of the present disclosure.

EMBODIMENTS OF THE PRESENT DISCLOSURE

Clear and complete descriptions will be made to technical solutions of embodiments of the present disclosure with reference to drawings of embodiments of the present disclosure. Obviously, the described embodiments are merely parts of embodiments instead of all embodiments of the present disclosure. Based on the embodiments illustrated in the present disclosure, other embodiments obtained by those skilled in the art without any inventive labor are all covered by the scope of the present disclosure.

Terms such as "first", "second" and "third" used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

The implementation of an image data processing method mentioned in embodiments of the present disclosure depends on computer programs executable in a computer system like Von Neumann system. These computer programs may be integrated in applications or developed as a separate tool-type application. The computer system may a terminal device such as a personal computer, a tablet computer, a laptop, a smart phone and the like.

The image data processing method, the image data processing apparatus, the electronic device and the storage medium will be described in detail as follows.

Figure 1:
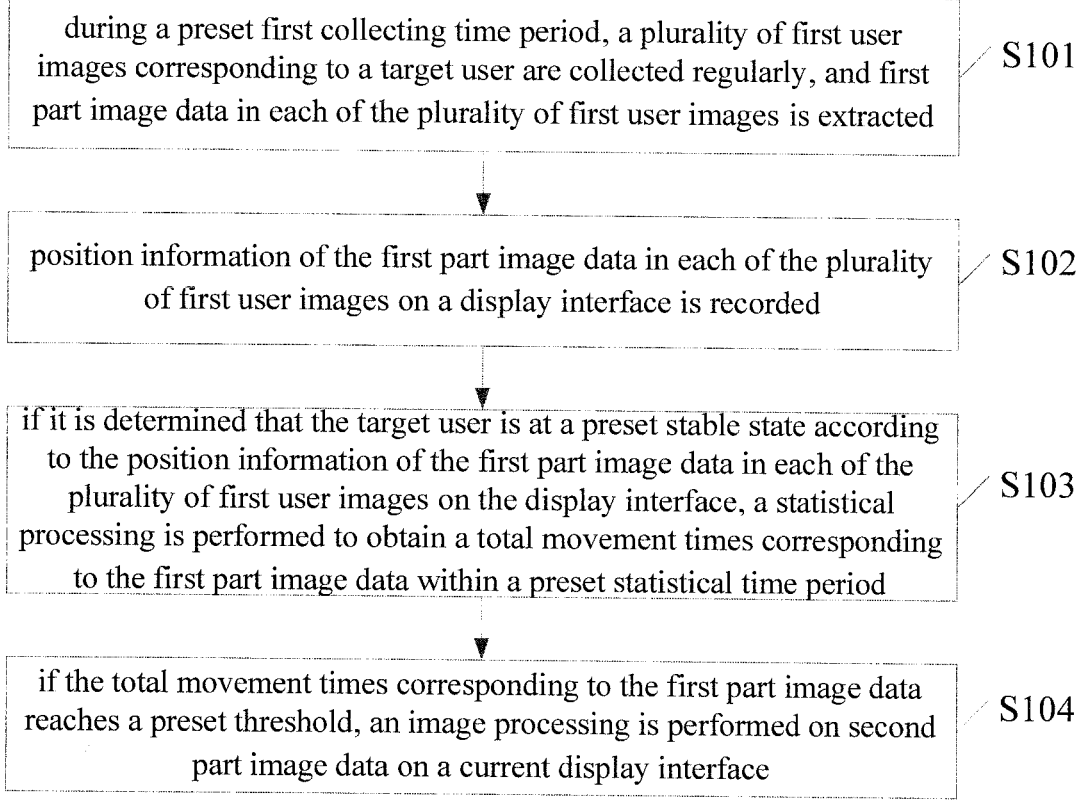
FIG. 1 is a flow chart of an image data processing method according to an embodiment of the present disclosure.

Referring to FIG. 1, FIG. 1 is a flow chart of an image data processing method according to an embodiment of the present disclosure. As shown in FIG. 1, the image data processing method may include at least followings.

At block S101, during a preset first collecting time period, a plurality of first user images corresponding to a target user are collected regularly, and first part image data in each of the plurality of first user images is extracted.

Specifically, a user terminal may collect the plurality of first user images corresponding to the target user regularly during the preset first collecting time period based on a preset collecting time interval. The first user image may be an image including facial profile region of the target user collected within the first collecting time period. The user terminal then may extract the first part image data in each of the plurality of first user images, in which the preset collecting time interval is smaller than the first collecting time period.

The user terminal may be a terminal device having a camera function, including a personal computer, a tablet computer, a laptop, a smart TV and a smart phone and the like.

The collecting time interval is configured as a time interval at which the first user images are collected regularly. For example, the first user images may be collected at a time interval of 1 s, and 1 s may be the collecting time interval here.

The first collecting time period may be configured as a time period during which several first user images are collected consecutively by the user terminal. For example, three first user images are collected within the first collecting time period (within 5 seconds).

The first part image data may be image data of eyes. The image data of eyes may include: image data of left eye and/or of right eye. Alternatively, the first part image data may also include image data of facial organs such as mouth, eyebrows and the like.

In view of this, in order to have a better understanding of the present solution, exemplarily, embodiments of the present disclosure may take the image data of eyes as the first part image data, for performing the following acts S102 and S103 and then S104. In this way, processing efficiency and processing effect for partial image data may be improved.

At block S102, position information of the first part image data in each of the plurality of first user images on a display interface is recorded.

The position information may include central position coordinates and a first part horizontal-axis distance.

The central position coordinates indicate coordinates of a center of a region occupied by the first part in the first user image on the display interface, mainly including a central position abscissa coordinate (X) and a central position vertical coordinate (Y).

Figure 2:
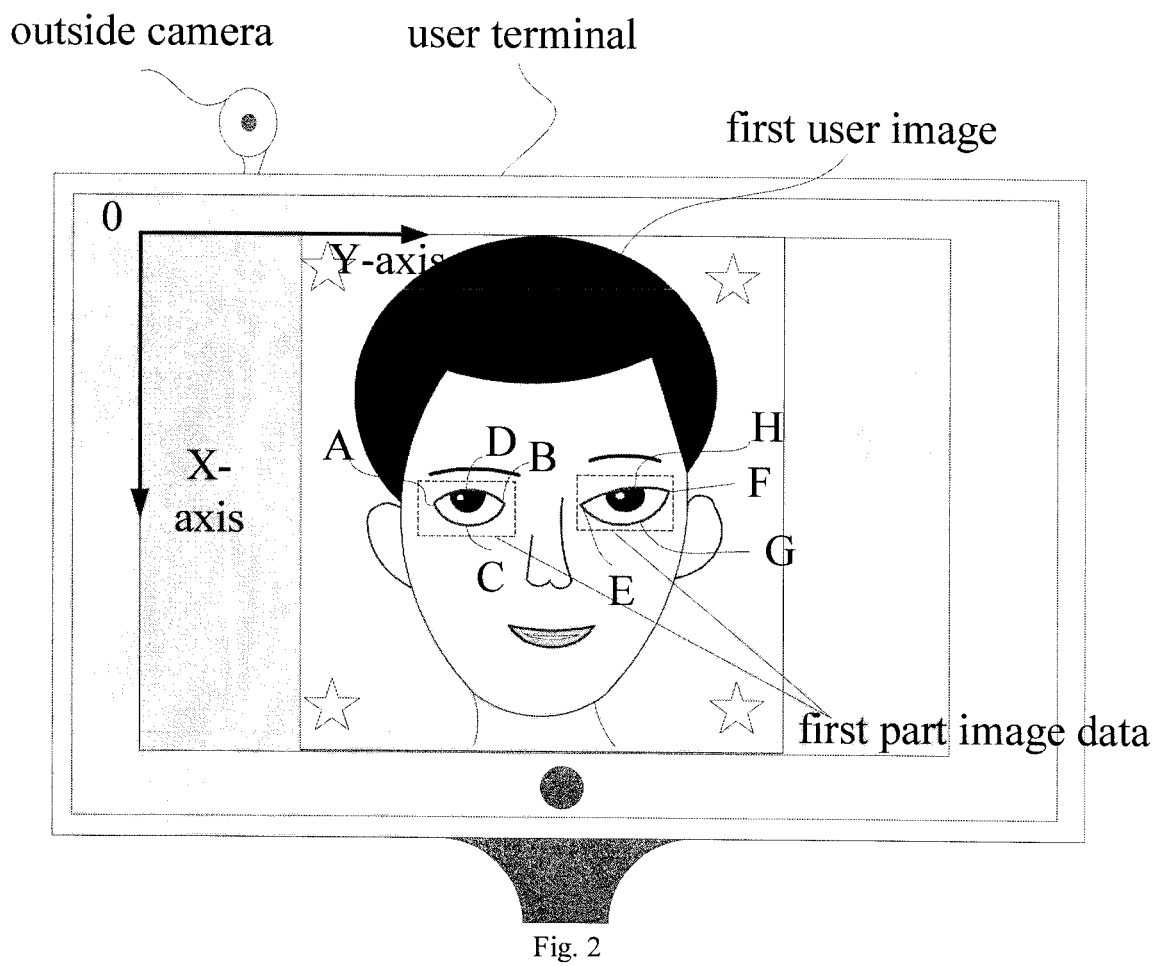
FIG. 2 is a schematic diagram showing a process of computing central position coordinates according to an embodiment of the present disclosure.

Further, referring to FIG. 2, FIG. 2 is a schematic diagram showing a process of computing central position coordinates according to an embodiment of the present disclosure. As shown in FIG. 2, the user terminal may collect the first user image corresponding to the target user at a time interval of is, and then may extract the first part image data in the first user image as shown in FIG. 2. The first part image data may be the image data of eyes as shown in FIG. 2, including image data of left eye and of right eye. Taking the image data of left eye as an example, a specific process of computing the central position coordinates of the region of left eye will described in detail as follows. Points A, B, C and D constitute a profile of the region occupied by the image data of left eye of the target user on the display interface, in which point A is represented by coordinates (PAx, PAy) on the display interface, point B is represented by coordinates (PBx, PBy) on the display interface, point C is represented by coordinates (PCx, PCy) on the display interface, and point D is represented by coordinates (PDx, PDy) on the display interface. Therefore, the user terminal may determine the central position coordinates of the region occupied by the image data of left eye of the target user on the display interface according to the coordinates of points A and B. the central abscissa coordinate of the left eye of the target user $L_X$ and the central vertical coordinate of the left eye of the target user $L_Y$ may be represented as follows respectively.

$$L_X = (P_A x + P_B x)/2 \quad (1.1)$$

$$L_Y = (P_A y + P_B y)/2 \quad (1.2)$$

Furthermore, the user terminal may compute the first part horizontal-axis distance of the left eye of the target user according to the coordinates of points A and B. Therefore, in the first user image shown in FIG. 2, the first part horizontal-axis distance of the left eye of the target user may be represented as follows.

$$L=\mathrm{sqrt}((P_Bx-P_Ax)*(P_Bx-P_Ax)+(P_By-P_Ay)*(P_By-P_Ay)) \quad (1.3)$$

Similarly, with respect to a region occupied by the right eye of the target user on the display interface (this region may be defined by points E, F, G and H). Regarding the computation of the central position coordinates of the region occupied by the image data of right eye of the target user on the display interface, reference may be made to the computing process regarding the central position coordinates of the region occupied by the image data of the left eye described above. The central abscissa coordinate $R_X$ and the central vertical coordinate $R_Y$ of the right eye of the target user may be represented as follows respectively.

$$R_X=(P_Fx+P_Ex)/2 \quad (1.4)$$

$$R_Y=(P_Ey+P_Ey)/2 \quad (1.5)$$

Furthermore, the user terminal may compute the first part horizontal-axis distance of the right eye of the target user according to the coordinates of points E and H. Therefore, in the first user image shown in FIG. 2, the first part horizontal-axis distance of the right eye of the target user may be represented as follows.

$$R=\mathrm{sqrt}((P_Fx-P_Ex)*(P_Fx-P_Ex)+(P_Fy-P_Ey)*(P_Fy-P_Ey)) \quad (1.6)$$

In view of this, the position information of the image data of eyes of other users collected by the user terminal within the first collecting time period displayed on the display interface may be computed similarly by referring to the above formulas (1.1)-(1.6), which will not be described in detail herein.

At block S103, if it is determined that the target user is at a preset stable state according to the position information of the first part image data in each of the plurality of first user images on the display interface, a statistical processing is performed to obtain a total movement times corresponding to the first part image data within a preset statistical time period.

Specifically, the user terminal may perform a difference analysis on position information of every two pieces of adjacent first part image data according to the position information of the first part image data in each of the plurality of first user images on the display interface, so as to acquire a difference analysis result corresponding to every two adjacent pieces of first part image data. If each difference analysis result satisfies a preset image stability condition, it may be determined that the target user is at the stable state, and then a statistical processing is performed to obtain a total movement times corresponding to the first part image data within a preset statistical time period.

The two adjacent pieces of first part image data are collected at two adjacent collecting time points.

When performing a difference analysis on position information of every two adjacent pieces of first part image data, the user terminal may compare position information of any two pieces of first part image data collected at two adjacent collecting time points, so as to determine whether the target user is at a stable state within the first collecting time period. In other words, the user terminal may acquire the difference analysis result by determining a difference between position information of two pieces of first part image data collected at two adjacent collecting time point s, so as to determine whether the difference analysis result satisfies a preset image stability condition. If each difference analysis result satisfies the preset image stability condition, it is determined that the target user is at the stable state, and then the statistical processing is performed by the user terminal to obtain the total movement times corresponding to the first part image data within the preset statistical time period.

At block S104, if the total movement times corresponding to the first part image data reaches a preset threshold, an image processing is performed on second part image data on a current display interface.

Specifically, the user terminal may process the second part image data on the current display interface when the total movement times corresponding to the first part image data counted within a preset time period reaches a preset threshold. The second part image data may be image data of eyes or mouth. If the second part image data is the image data of eyes, a zoom-in processing may be performed on the image data of eyes on the display interface. Alternatively, if the second part image data is the image data of mouth, a lip enhancement processing may be performed on the image data of mouth on the display interface.

Alternatively, the second part image data may be image data of other facial organs of the target user.

Further, referring to FIG. 3, FIG. 3 is a schematic diagram of a method for performing statistical processing to obtain a movement times according to an embodiment of the present disclosure. As shown in FIG. 3, a specific process for counting the movement times includes acts S201-S204 being a specific embodiment of act S103 in the embodiment illustrated in FIG. 1.

At block S201, during a preset second collecting time period, a plurality of second user images corresponding to the target user are collected regularly, and first part image data in each of the plurality of second user images are extracted.

Specifically, a user terminal may collect a plurality of second user images corresponding to the target user regularly during a preset second collecting time period. The second user image may be an image including facial profile region of the target user collected within the second collecting time period. The user terminal then may extract first part image data in each of the plurality of second user images.

The first part image data may be image data of eyes.

When central position coordinates of a region occupied by eyes of the target user detected in time shift or when the region occupied by the eyes changes, the user terminal may trigger a countdown for a preset statistical time period, so as to perform act S202 within the preset statistical time period. Therefore, the movement times of the target user may increase.

At block S202, a first part vertical-axis distance corresponding to the first part image data in each of the plurality of second user images is computed to obtain a plurality of first part vertical-axis distances.

Regarding the formula for computing the first part vertical-axis distance, reference may be made to the description of computing the first part horizontal-axis distance in the embodiment corresponding to FIG. 1. For example, by exemplarily taking the image data of eyes as the first part image data, the first part vertical-axis distances of the left eye and the right eye of the target user may be computed by the user terminal respectively according to coordinates of the points C, D, G and H.

$$L'=\mathrm{sqrt}((P_Dx-P_Cx)*(P_Dx-P_Cx)+(P_Dy-P_Cy)*(P_Dy-P_Cy)) \quad (1.7)$$

$$R'=\text{sqrt}((P_Hx-P_Gx)*(P_Hx-P_Gx)+(P_Hy-P_Gy)*(P_Hy-P_Gy))) \qquad (1.8)$$

Therefore, the first part vertical-axis distance L' of the left eye and the first part vertical-axis distance R' of the right eye may be computed according to formulas (7) and (8) respectively. During the second collecting time period, for the first part image data in the plurality of second user images, a plurality of first part vertical-axis distances corresponding to each first part image data may be acquired respectively.

At block S203, a maximum first part vertical-axis distance and a minimum first part vertical-axis distance are selected from the plurality of first part vertical-axis distances, and an absolute value of a difference between the maximum first part vertical-axis distance and the minimum first part vertical-axis distance is computed, and a third difference ratio of the absolute value of the difference to the maximum first part vertical-axis distance is computed.

Specifically, the user terminal may select the maximum first part vertical-axis distance and the minimum first part vertical-axis distance from the computed first part vertical-axis distances, compute the difference between the maximum first part vertical-axis distance and the minimum first part vertical-axis distance and an absolute value of the computed difference, and compute a third difference ratio of the absolute value of the difference to the maximum first part vertical-axis distance.

For example, when the second collecting time period is 10 seconds, if the user terminal collects five second user images corresponding to the target user within 10 seconds, and five pieces of first part image data (such as the image data of left eye) corresponding to the five second user images may be extracted, the user terminal may further compute the first part vertical-axis distances of the five pieces of image data of left eye on the display interface. For example, within 10 seconds, the first part vertical-axis distances of the five pieces of image data of left eye may be computed as 1.2 cm, 2 cm, 1.5 cm, 0.8 cm and 0.2 cm. The user terminal may determine 2 cm as the maximum first part vertical-axis distance and 0.2 cm as the minimum first part vertical-axis distance. After that, the user terminal may further compute the absolute value (1.8 cm) of a difference between the minimum first part vertical-axis distance and the maximum first part vertical-axis distance, and acquire the third difference ratio (1.8 cm/2 cm=0.9) of the absolute value of the difference to the maximum first part vertical-axis distance. Thus, the user terminal may further determine whether the third difference ratio is greater than a preset third ratio threshold according to the third difference ratio. If the third ratio threshold is 0.8, the user terminal may determine that the third difference ratio is greater than the preset third ratio threshold, and perform act S204 and add one to the movement times corresponding to the first part image data. Alternatively, if the third ratio threshold is 0.91, the user terminal may determine that the third difference ratio is smaller than the preset third ratio threshold, thus the terminal does not add one to the movement times corresponding to the first part image data. Therefore, the user terminal may repeat acts S201-S203 in the next second collecting cycle, so as to acquire the total movement times corresponding to the first part image data.

At block S204, if the third difference ratio is greater than a preset third ratio threshold, a movement times corresponding to the first part image data is increased by one, and the movement times corresponding to the first part image data during a next second collecting time period is detected continuously, so as to perform the statistical processing to obtain the total movement times corresponding to the first part image data within the preset statistical time period, in which the preset statistical time period is greater than the second collecting time period.

For example, the preset statistical time period may include three second collecting time periods, the user terminal may compute the first part vertical-axis distance corresponding to the first part image data in each second user image within a first one of the three second collecting time periods, compute an absolute value of a difference between the maximum first part vertical-axis distance and the minimum first part vertical-axis distance in the first part vertical-axis distances, and compute a third difference ratio of the absolute value of the difference to the maximum first part vertical-axis distance. If the third difference ratio is greater than a preset third ratio threshold within the first one of the three second collecting time periods, the movement times is increased by one; otherwise, the movement times detected by the user terminal within the first one of the three second collecting time periods is zero.

Therefore, with respect to the three second collecting time periods of the preset statistical time period, the user terminal may detect a movement times within each of the three second collecting time periods, in which the movement times may be one or zero. For example, the movement times detected within the first one of the three second collecting time periods is one, the movement times detected within the second one of the three second collecting time periods is zero, and the movement times detected within the third one of the three second collecting time periods is one, and thus, the total movement times detected within the preset statistical time period is 2.

Therefore, with embodiments of the present disclosure, during a preset first collecting time period, a plurality of first user images corresponding to a target user may be collected regularly, and first part image data in each of the plurality of first user images may be extracted. position information of the first part image data in each of the plurality of first user images on a display interface may be recorded, and if it is determined that the target user is at a preset stable state according to the position information of the first part image data in each of the plurality of first user images on the display interface, a statistical processing may be performed to obtain a total movement times corresponding to the first part image data within a preset statistical time period; and if the total movement times corresponding to the first part image data reaches a preset threshold, an image processing may be performed on second part image data on a current display interface. With the present disclosure, when the target user is at the stable state, the total movement times corresponding to the first part image data can be counted, and when the total movement times reaches a preset threshold, the image processing can be performed on the second part image data on the display interface. Thus, complex manual operations may be avoided, and it may be unnecessary to display an additional manual control when processing the second part image data, which may enlarge displaying area of the image data, thereby improving the displaying effect of the image data.

Figure 4:
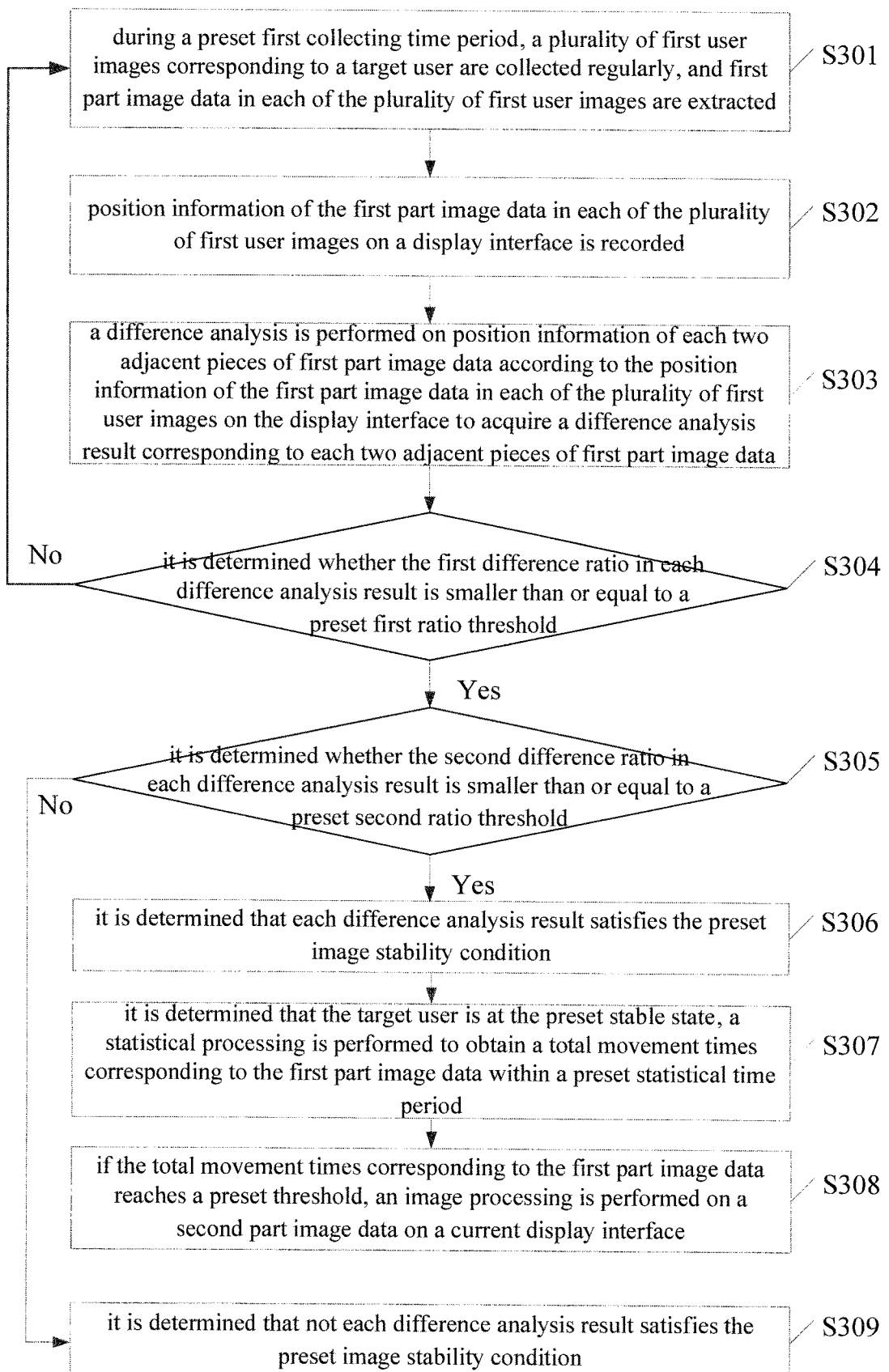
FIG. 4 is a flow chart of an image data processing method according to another embodiment of the present disclosure.

Further, referring to FIG. 4, FIG. 4 is a flow chart of an image data processing method according to another embodiment of the present disclosure. As shown in FIG. 4, the image data processing method at least includes followings.

At block S301, during a preset first collecting time period, a plurality of first user images corresponding to a target user are collected regularly, and first part image data in each of the plurality of first user images are extracted.

At block S302, position information of the first part image data in each of the plurality of first user images on a display interface is recorded.

Regarding the specific implementation of acts S301-S302, reference may be made to the specific description of acts S101-S102 of the embodiment corresponding to FIG. 1, which will not be described in detail herein.

At block S303, a difference analysis is performed on position information of every two adjacent pieces of first part image data according to the position information of the first part image data in each of the plurality of first user images on the display interface to acquire a difference analysis result corresponding to every two adjacent pieces of first part image data.

Specifically, the two adjacent pieces of first part image data are selected by the user terminal from the first part image data in each of the plurality of first user images as two pieces of target image data. First position information and second position information of the two pieces of target image data on the display interface are acquired. A central position distance between central position coordinates included in the first position information and central position coordinates included in the second location information is computed, and a first difference ratio of the central position distance to the first part horizontal-axis distance included in the first position information is computed. An absolute value of a difference between the first part horizontal-axis distance included in the first position information and the first part horizontal-axis distance included in the second position information is computed, and a second difference ratio of the absolute value of the difference to the first part horizontal-axis distance included in the first position information is computed. The first difference ratio and the second difference ratio are determined as a difference analysis result corresponding to the two pieces of target image data. When every two adjacent pieces of first part image data in the first part image data are selected as the two pieces of target image data, the difference analysis result corresponding to every two adjacent pieces of first part image data is acquired.

The two adjacent pieces of first part image data are collected at two adjacent collecting time points.

Each of the first position information and the second position information includes central position coordinates and a first part horizontal-axis distance.

For example, within the first collecting time period (five seconds), the first user images corresponding to the target user may be collected at a time interval of one second. The first user image may be an image including facial profile region of the target user. The user terminal then may acquire five first user images corresponding to the target user within five seconds, in which the five first user images may include user images 100A, 100B, 100C, 100D and 100E. Five pieces of first part image data (such as, image data of left eye) may be extracted from the five first user image respectively. The five pieces of first part image data may include image data 200A, 200B, 200C, 200D and 200E of left eye, and position information of the five pieces of image data of left eye on a same display interface may be recorded.

The first part image data in the user image 100A is the image data 200A of left eye, the first part image data in the user image 100B is the image data 200B of left eye, the first part image data in the user image 100C is the image data 200C of left eye, the first part image data in the user image 100D is the image data 200D of left eye, and the first part image data in the user image 100E is the image data 200E of left eye. Further, referring to Table 1, Table 1 lists the position information of the first part image data on the display interface recorded by the user terminal within the preset first collecting time period.

TABLE 1

| first user image | first part image data | central position coordinates | first part horizontal-axis distance |
|---|---|---|---|
| user image 100A | image data 200A of left eye | $(L_X1, L_Y1)$ | L1 |
| user image 100B | image data 200B of left eye | $(L_X2, L_Y2)$ | L2 |
| user image 100C | image data 200C of left eye | $(L_X3, L_Y3)$ | L3 |
| user image 100D | image data 200D of left eye | $(L_X4, L_Y4)$ | L4 |
| user image 100E | image data 200E of left eye | $(L_X5, L_Y5)$ | L5 |

As shown in Table 1, the image data 200A of left eye and the image data 200B of left eye are two adjacent pieces of first part image data, the image data 200B of left eye and the image data 200C of left eye are two adjacent pieces of first part image data, the image data 200C of left eye and the image data 200D of left eye are two adjacent pieces of first part image data, and the image data 200D of left eye and the image data 200E of left eye are two adjacent pieces of first part image data. Therefore, the user terminal may acquire four groups of two pieces of target image data from the five pieces of first part image data. For example, the image data 200B of left eye and the image data 200C of left eye may be regarded as the two pieces of target image data, the user terminal may acquire first position information (the central position coordinates $(L_X1, L_Y1)$) and the first part horizontal-axis distance L1) and the second position information (the central position coordinates $(L_X2, L_Y2)$ and the first part horizontal-axis distance L2) of the two pieces of target image data on the display interface.

Figure 5A:
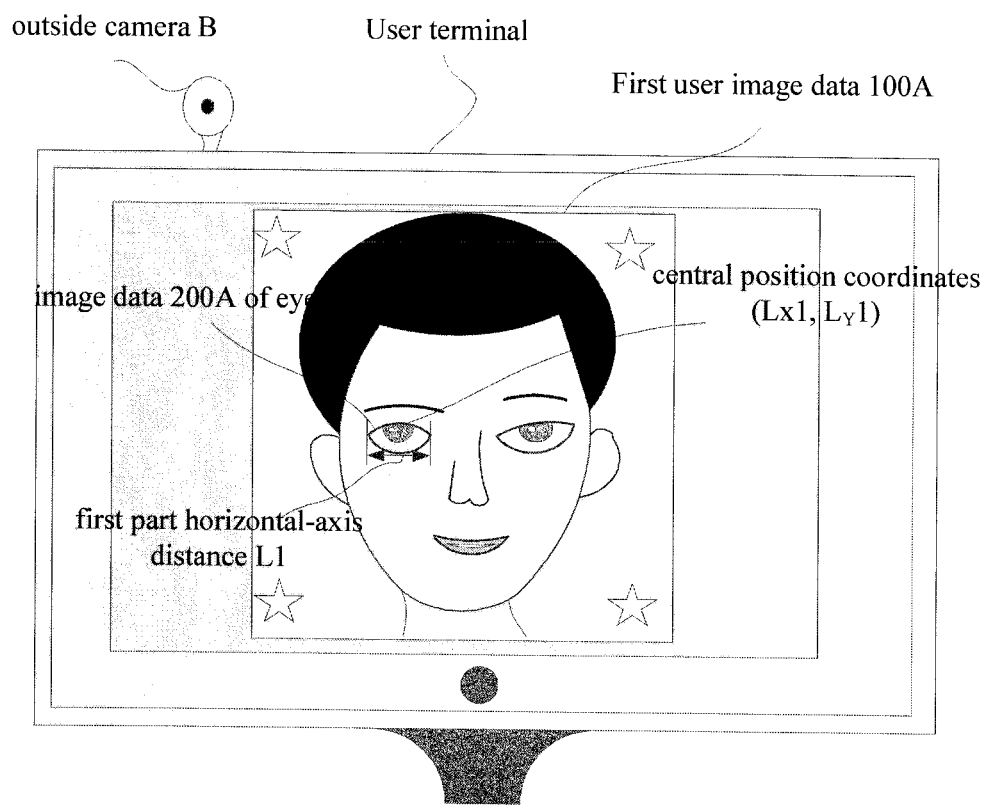
FIGS. 5a and 5b are schematic diagrams illustrating position information of two pieces of target image data on a display interface according to an embodiment of the present disclosure.
Figure 5B:
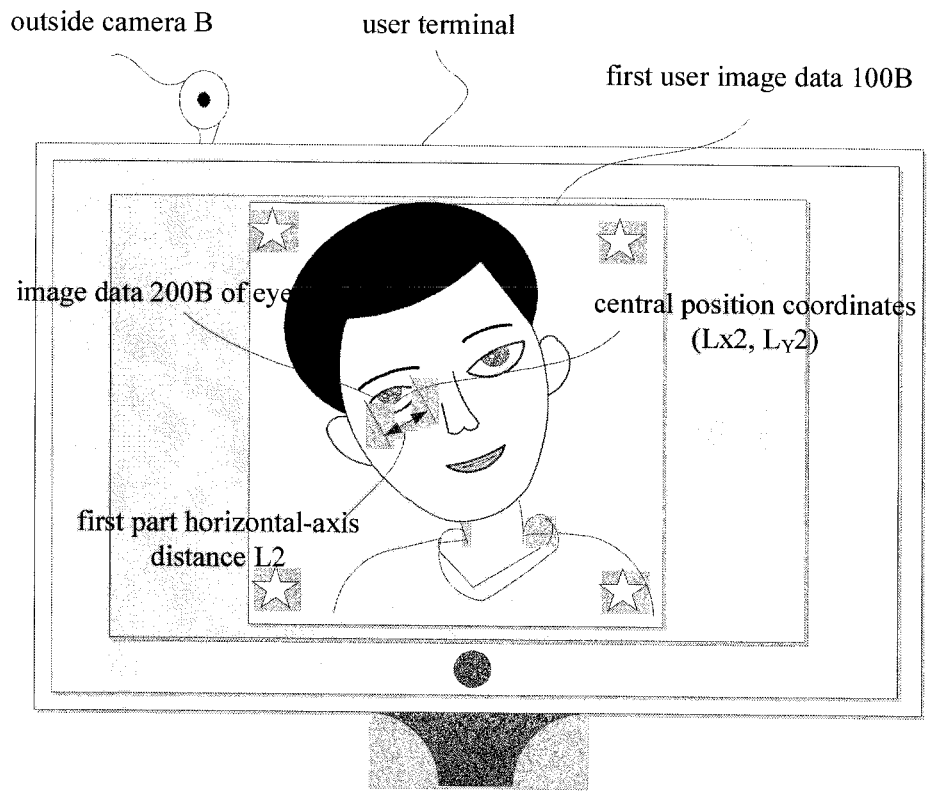

Further, referring to FIGS. 5a and 5b, FIGS. 5a and 5b are schematic diagrams illustrating position information of two pieces of target image data on a display interface according to an embodiment of the present disclosure. FIG. 5a is a schematic diagram of the first user image 100A collected by the target user at a first collecting time point (the first second), and FIG. 5b is a schematic diagram of the first user image 100B collected by the target user at a second collecting time point (the second second). Regarding formulas for computing the central position coordinates and the first part horizontal-axis distance of the left eye of the target user on the display interface, reference may be made to formulas (1.1), (1.2) and (1.3) in the embodiment corresponding to FIG. 1.

Thus, the user terminal may further perform a difference analysis on the position information obtained at the two adjacent collecting points. In other words, the user terminal may compute a central position distance M at the two collecting time points according to the central position coordinates $(L_X1, L_Y1)$ of the image data 200A of left eye on the display interface and the central position coordinates $(L_X2, L_Y2)$ of the image data 200B of left eye on the display interface. The central position distance M may be represented as follows.

$$M = \text{sqrt}((X2-X1)*(X2-X1)+(Y2-Y1)*(Y2-Y1)) \quad (1.9)$$

After that, the user terminal may further compute the first difference ratio (M/L1) of the central position distance M to the first part horizontal-axis distance L1 in the first position information.

At the same time, the user terminal may also compute an absolute value of a difference between the first part horizontal-axis distance L1 of the image data 200A of left eye on the display interface and the first part horizontal-axis distance L2 of the image data 200B of left eye on the display interface. The user terminal may compute the absolute value N of the difference between first part horizontal-axis distances collected at two adjacent time points by formula (1.10).

$$N=\text{sqrt}((L1-L2)*(L1-L2)) \quad (1.10)$$

After that, the user terminal may further compute the second difference ratio (N/L1) of the absolute value N to the first part horizontal-axis distance L1 in the first position information, and the first difference ratio (M/L1) and the second difference ratio (N/L1) are regarded as the difference analysis result corresponding to the two pieces of target image data.

The first difference ratio is used to determine whether the central position coordinates of the target user shift. For example, when a head of the target user is left-shifted, the central position coordinates of the left eye of the target user will shift compared to the central position coordinates collected at the last collecting time point.

The second difference ratio is used to determine whether the target user is far away from or close to the display interface. The first part horizontal-axis distances of the first part image data on the display interface under different distances may be different. For example, if the target user is close to the display interface (for example, 10 cm), a large first user image may be acquired. As shown in FIG. 5a, only a region of the head of the target user may be displayed on the display interface. However, if the target user is far away from the display interface (for example, 20 cm), the region of the head and a part of the body of the target user may be displayed on the display interface as the first user image, such that the region occupied by the head of the target user on the display interface may be small, referring to the first user image 100B shown in FIG. 5b.

Similarly, regarding specific implementations of acquiring the different analysis results corresponding to other three groups of two pieces of target image data, reference may be made to the description of configuring the image data 200A of left eye and the image data 200B of left eye as the two pieces of target image data, the implementations of acquiring the corresponding difference analysis result (the first difference ratio (M/L1) and the second difference ratio (N/L1)) will not be described in detail here.

At block S304, it is determined whether the first difference ratio in each difference analysis result is smaller than or equal to a preset first ratio threshold.

Specifically, the user terminal may further determine whether to perform act S305 or repeat act S301 according to a relationship between the first difference ratio and the first ratio threshold after act S304 is performed.

The first ratio threshold may be 5/100=0.05.

At block S305, if the first difference ratio in each difference analysis result is smaller than or equal to the preset first ratio threshold, it is determined whether the second difference ratio in each difference analysis result is smaller than or equal to a preset second ratio threshold.

Specifically, after act S305 is performed, when the second difference ratio is smaller than or equal to the second ratio threshold, the user terminal may further perform acts S306-S308. Alternatively, when there is at least one second difference ratio is greater than the second ratio threshold, the user terminal may further perform act S309. The second ratio threshold is 1/100=0.01.

At block S306, if the second difference ratio in each difference analysis result is smaller than or equal to the preset second ratio threshold, it is determined that each difference analysis result satisfies the preset image stability condition.

The image stability condition is used to describe that the central position coordinates and a first part horizontal-axis distance of the target user are in a small shifting range or hardly shifted.

At block S307, if it is determined that the target user is at the preset stable state, a statistical processing is performed to obtain a total movement times corresponding to the first part image data within a preset statistical time period.

Regarding the movement times statistics, reference may be made to the description of acts S201-S204 in the embodiment corresponding to FIG. 1, which will not be described in detail here.

At block S308, if the total movement times corresponding to the first part image data reaches a preset threshold, an image processing is performed on second part image data on a current display interface.

Regarding the specific implementation of act S308, reference may be made to the description of act S104 in the embodiment corresponding to FIG. 1.

At block S309, if there is at least one of the second difference ratios is greater than the second ratio threshold, it is determined that not each difference analysis result satisfies the preset image stability condition.

With embodiments of the present disclosure, during a preset first collecting time period, a plurality of first user images corresponding to a target user may be collected regularly, and first part image data in each of the plurality of first user images may be extracted, position information of the first part image data in each of the plurality of first user images on a display interface may be recorded, and if it is determined that the target user is at a preset stable state according to the position information of the first part image data in each of the plurality of first user images on the display interface, a statistical processing may be performed to obtain a total movement times corresponding to the first part image data within a preset statistical time period; and if the total movement times corresponding to the first part image data reaches a preset threshold, an image processing may be performed on second part image data on a current display interface. With the present disclosure, when the target user is at the stable state, the total movement times corresponding to the first part image data can be counted, and when the total movement times reaches a preset threshold, the image processing can be performed on the second part image data on the display interface. Thus, complex manual operations may be avoided, and it may be unnecessary to display an additional manual control when processing the second part image data, which may enlarge displaying area of the image data, thereby improving the displaying effect of the image data.

Figure 6:
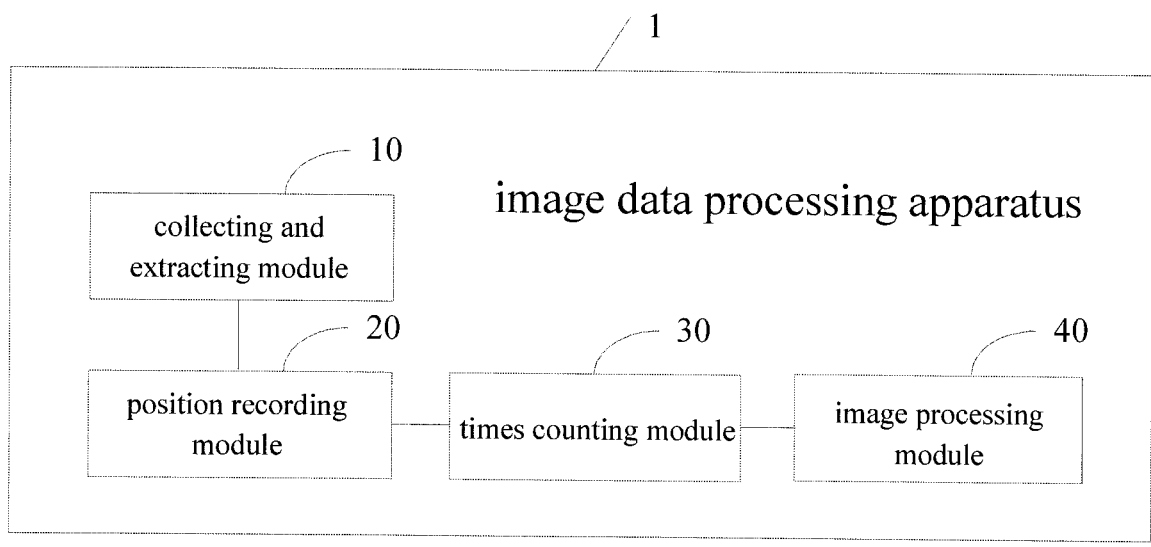
FIG. 6 is a block diagram of an image data processing apparatus according to an embodiment of the present disclosure.

Further, referring to FIG. 6, FIG. 6 is a structure diagram of an image data processing apparatus according to an embodiment of the present disclosure. As shown in FIG. 6, the image data processing apparatus 1 may be applied to the user terminal mentioned in the embodiment corresponding to FIG. 1. The image data processing apparatus 1 at least includes: a collecting and extracting module 10, a position recording module 20, a times counting module 30 and an image processing module 40.

The collecting and extracting module 10 is configured to collect regularly a plurality of first user images corresponding to a target user during a preset first collecting time period, and to extract first part image data in each of the plurality of first user images.

The position recording module 20 is configured to record position information of the first part image data in each of the plurality of first user images on a display interface.

The times counting module 30 is configured to perform a statistical processing to obtain a total movement times corresponding to the first part image data within a preset statistical time period when it is determined that the target user is at a preset stable state according to the position information of the first part image data in each of the plurality of first user images on the display interface.

The image processing module 40 is configured to perform an image processing on second part image data on a current display interface when the total movement times corresponding to the first part image data reaches a preset threshold.

Regarding specific implementations of the collecting and extracting module 10, the position recording module 20, the times counting module 30 and the image processing module 40, reference may be made to description of acts S101-S104 in the embodiment corresponding to FIG. 1, which will not be described in detail here.

With embodiments of the present disclosure, during a preset first collecting time period, a plurality of first user images corresponding to a target user may be collected regularly, and first part image data in each of the plurality of first user images may be extracted, position information of the first part image data in each of the plurality of first user images on a display interface may be recorded, and if it is determined that the target user is at a preset stable state according to the position information of the first part image data in each of the plurality of first user images on the display interface, a statistical processing may be performed to obtain a total movement times corresponding to the first part image data within a preset statistical time period; and if the total movement times corresponding to the first part image data reaches a preset threshold, an image processing may be performed on second part image data on a current display interface. With the present disclosure, when the target user is at the stable state, the total movement times corresponding to the first part image data can be counted, and when the total movement times reaches a preset threshold, the image processing can be performed on the second part image data on the display interface. Thus, complex manual operations may be avoided, and it may be unnecessary to display an additional manual control when processing the second part image data, which may enlarge displaying area of the image data, thereby improving the displaying effect of the image data.

Figure 7:
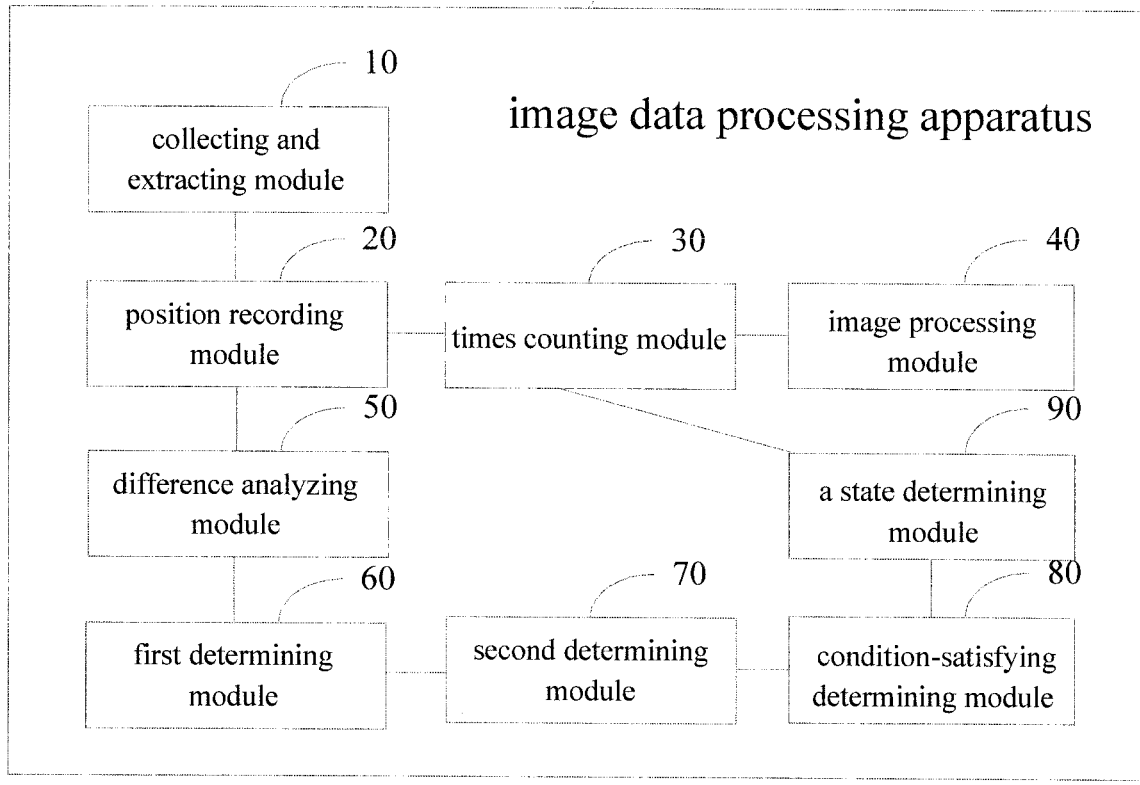
FIG. 7 is a block diagram of an image data processing apparatus according to another embodiment of the present disclosure.

Further, referring to FIG. 7, FIG. 7 is a structure diagram of an image data processing apparatus according to another embodiment of the present disclosure. As shown in FIG. 7, the image data processing apparatus 1 may be applied to the user terminal mentioned in the embodiment corresponding to FIG. 1. The image data processing apparatus 1 may include the collecting and extracting module 10, the position recording module 20, the times counting module 30 and the image processing module 40 in the embodiment corresponding to FIG. 6, and the image data processing apparatus 1 may also include: a difference analyzing module 50, a first determining module 60, a second determining module 70, a condition-satisfying determining module 80, and a state determining module 90.

The difference analyzing module 50 is configured to perform a difference analysis on position information of every two adjacent pieces of first part image data according to the position information of the first part image data in each of the plurality of first user images on the display interface, so as to acquire a difference analysis result corresponding to every two adjacent pieces of first part image data, in which two adjacent pieces of first part image data are collected at two adjacent collecting time points.

The first determining module 60 is configured to determine whether the first difference ratio in each difference analysis result is smaller than or equal to a preset first ratio threshold.

The second determining module 70 is configured to determine whether the second difference ratio in each difference analysis result is smaller than or equal to a preset second ratio threshold when the first difference ratio in each difference analysis result is smaller than or equal to the preset first ratio threshold.

The condition-satisfying determining module 80 is configured to determine that each difference analysis result satisfies the preset image stability condition when the second difference ratio in each difference analysis result is smaller than or equal to the preset second ratio threshold.

The state determining module 90 is configured to determine that the target user is at the stable state if the difference analysis result satisfies a preset image stability condition.

Regarding the implementations of the difference analyzing module 50, the first determining module 60, the second determining module 70, the condition-satisfying determining module 80, and the state determining module 90, reference may be made to description of acts S303-S307 in the embodiment corresponding to FIG. 4, which will not be described here.

Figure 8:
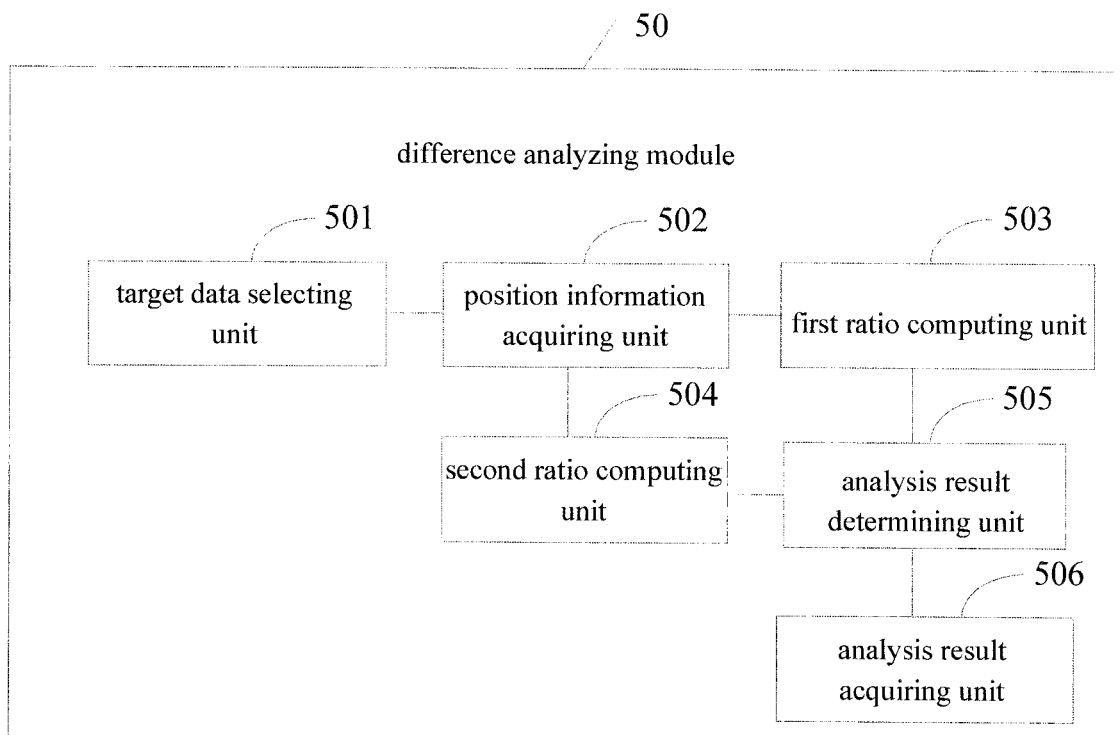
FIG. 8 is a block diagram of a difference analyzing module according to an embodiment of the present disclosure.

Further, referring to FIG. 8, FIG. 8 is a structure diagram of a difference analyzing module according to an embodiment of the present disclosure. As shown in FIG. 8, the difference analyzing module 50 may include: a target data selecting unit 501, a position information acquiring unit 502, a first ratio computing unit 503, a second ratio computing unit 504, an analysis result determining unit 505, and an analysis result acquiring unit 506.

The target data selecting unit 501 is configured to select two adjacent pieces of first part image data from the first part image data in each of the plurality of first user images as two pieces of target image data.

The position information acquiring unit 502 is configured to acquire first position information and second position information of the two pieces of target image data on the display interface, in which each of the first position information and the second position information includes central position coordinates and a first part horizontal-axis distance.

The first ratio computing unit 503 is configured to compute a central position distance between central position coordinates included in the first position information and central position coordinates included in the second location information, and to compute a first difference ratio of the central position distance to the first part horizontal-axis distance included in the first position information.

The second ratio computing unit 504 is configured to compute an absolute value of a difference between the first part horizontal-axis distance included in the first position information and the first part horizontal-axis distance included in the second position information, and to compute a second difference ratio of the absolute value of the difference to the first part horizontal-axis distance included in the first position information.

The analysis result determining unit 505 is configured to determine the first difference ratio and the second difference ratio as the difference analysis result corresponding to the two pieces of target image data.

The analysis result acquiring unit 506 is configured to acquire the difference analysis result corresponding to every two adjacent pieces of first part image data when the every two adjacent pieces of first part image data are selected as the two pieces of target image data.

Regarding the implementations of the target data selecting unit 501, the position information acquiring unit 502, the first ratio computing unit 503, the second ratio computing unit 504, the analysis result determining unit 505, and the analysis result acquiring unit 506, reference may be made to description of act S303 in the embodiment corresponding to FIG. 4, which will not be described here.

Figure 9:
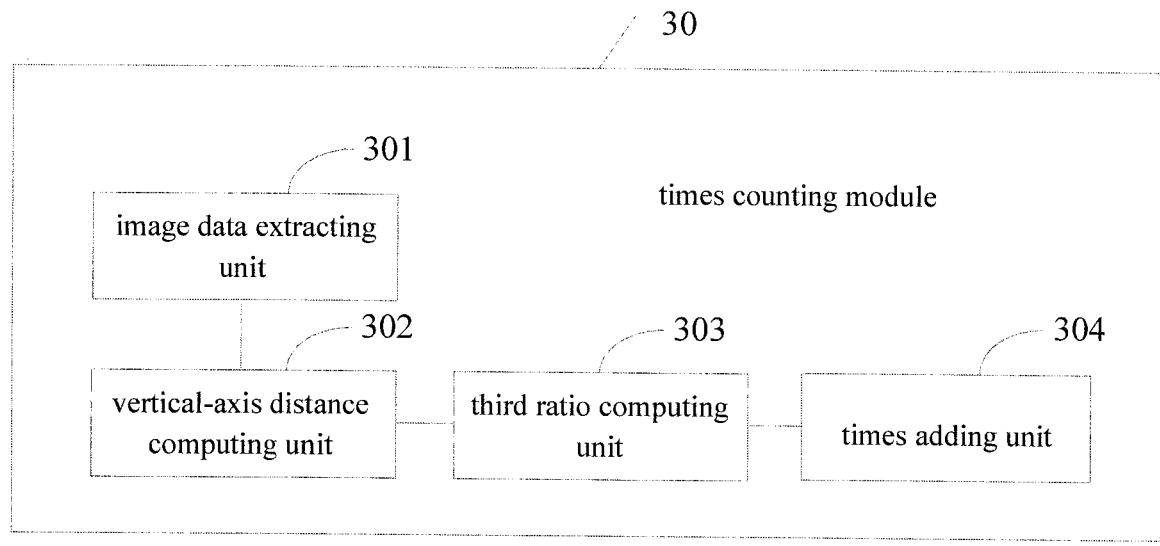
FIG. 9 is a block diagram of a times counting module according to an embodiment of the present disclosure.

Further, referring to FIG. 9, FIG. 9 is a structure diagram of a times counting module according to an embodiment of the present disclosure. As shown in FIG. 9, the times counting module 30 may include: an image data extracting unit 301, a vertical-axis distance computing unit 302, a third ratio computing unit 303, and a times adding unit 304.

The image data extracting unit 301 is configured to collect regularly a plurality of second user images corresponding to a target user during a preset second collecting time period, and to extract first part image data in each of the plurality of second user images.

The vertical-axis distance computing unit 302 is configured to compute a first part vertical-axis distance corresponding to the first part image data in each of the plurality of second user images to obtain a plurality of first part vertical-axis distances.

The third ratio computing unit 303 is configured to select a maximum first part vertical-axis distance and a minimum first part vertical-axis distance from the plurality of first part vertical-axis distances, and to compute an absolute value of a difference between the maximum first part vertical-axis distance and the minimum first part vertical-axis distance, and to compute a third difference ratio of the absolute value of the difference and to maximum first part vertical-axis distance.

The times adding unit 304 is configured to add one to a movement times corresponding to the first part image data when the third difference ratio is greater than a preset third ratio threshold, and to detect a movement times corresponding to the first part image data during a next second collecting time period, so as to perform the statistical processing to obtain the total movement times corresponding to the first part image data within the preset statistical time period, in which the preset statistical time period is longer than the second collecting time period.

Regarding the implementations of the image data extracting unit 301, the vertical-axis distance computing unit 302, the third ratio computing unit 303 and the times adding unit 304, reference may be made to description of acts S201-S204 in the embodiment corresponding to FIG. 3, which will not be described here.

Therefore, with embodiments of the present disclosure, during a preset first collecting time period, a plurality of first user images corresponding to a target user may be collected regularly, and first part image data in each of the plurality of first user images may be extracted, position information of the first part image data in each of the plurality of first user images on a display interface may be recorded, and if it is determined that the target user is at a preset stable state according to the position information of the first part image data in each of the plurality of first user images on the display interface, a statistical processing may be performed to obtain a total movement times corresponding to the first part image data within a preset statistical time period; and if the total movement times corresponding to the first part image data reaches a preset threshold, an image processing may be performed on second part image data on a current display interface. With the present disclosure, when the target user is at the stable state, the total movement times corresponding to the first part image data can be counted, and when the total movement times reaches a preset threshold, the image processing can be performed on the second part image data on the display interface. Thus, complex manual operations may be avoided, and it may be unnecessary to display an additional manual control when processing the second part image data, which may enlarge displaying area of the image data, thereby improving the displaying effect of the image data.

Figure 10:
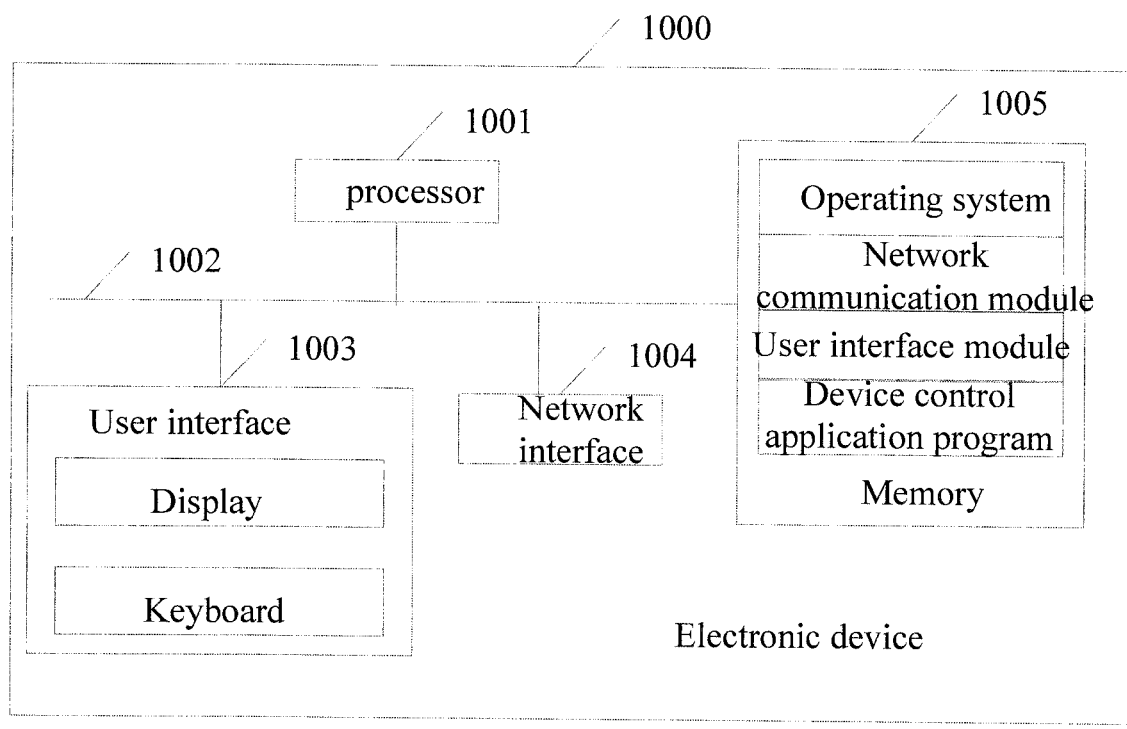
FIG. 10 is a block diagram of an electronic device according to an embodiment of the present disclosure.

Further, referring to FIG. 10, FIG. 10 is a structure diagram of an electronic device according to an embodiment of the present disclosure. As shown in FIG. 10, the electronic device 1000 may be the user terminal described in the embodiment corresponding to FIG. 1. The electronic device 1000 may include a processor 1001 and a memory 1005. Further, the electronic device 1000 may also include: at least one network interface 1004, a user interface 1003 and at least one communication bus 1002. The communication bus 1002 is configured to realize connections and communications between the elements. The user interface 1003 may also include a display and a keyboard. Alternatively, the user interface 1003 may also include a standard wired interface and a wireless interface (such as a WI-FI interface). The memory 1005 may be a high-speed RAM or may be a non-volatile memory, for example, may be at least one disk memory. Alternatively, the memory 1005 may be at least one storage device apart from the processor 1001. As shown in FIG. 10, as a computer storage medium, the memory 1005 may include an operating system, a network communication module, a user interface module and a device control application program.

In the electronic device 1000 illustrated in FIG. 10, the user interface 1003 is mainly configured to provide an input interface to the user and to acquire data inputted by the user. The processor 1001 may be configured to call the device control application program stored in the memory 1005, so as to perform: collecting regularly a plurality of first user images corresponding to a target user during a preset first collecting time period, and extracting first part image data in each of the plurality of first user images; recording position information of the first part image data in each of the plurality of first user images on a display interface; when it is determined that the target user is at a preset stable state according to the position information of the first part image data in each of the plurality of first user images on the display interface, performing a statistical processing to obtain a total movement times corresponding to the first part image data within a preset statistical time period; and when the total movement times corresponding to the first part image data reaches a preset threshold, performing an image processing on second part image data on a current display interface.

In an embodiment, before the statistical processing is performed to obtain the total movement times corresponding to the first part image data within the preset statistical time period, the processor 1001 is further configured to perform: performing a difference analysis on position information of every two adjacent pieces of first part image data according to the position information of the first part image data in each of the plurality of first user images on the display interface to acquire a difference analysis result corresponding to every two adjacent pieces of first part image data, in which two adjacent pieces of first part image data are collected at two adjacent collecting time points; and when each difference analysis result satisfies a preset image stability condition, determining that the target user is at the stable state.

In an embodiment, when the processor 1001 performs a difference analysis on position information of every two adjacent pieces of first part image data according to the position information of the first part image data in each of the plurality of first user images on the display interface to acquire a difference analysis result corresponding to every two adjacent pieces of first part image data, the processor 1001 is further configured to perform: selecting the two adjacent pieces of first part image data from the first part image data in each of the plurality of first user images as two pieces of target image data; acquiring first position information and second position information of the two pieces of target image data on the display interface, in which each of the first position information and the second position information includes central position coordinates and a first part horizontal-axis distance; computing a central position distance between central position coordinates included in the first position information and central position coordinates included in the second location information, and computing a first difference ratio of the central position distance to the first part horizontal-axis distance included in the first position information; computing an absolute value of a difference between the first part horizontal-axis distance included in the first position information and the first part horizontal-axis distance included in the second position information, and computing a second difference ratio of the absolute value of the difference to the first part horizontal-axis distance included in the first position information; determining the first difference ratio and the second difference ratio as the difference analysis result corresponding to the two pieces of target image data; and when every two adjacent pieces of first part image data are selected as the two pieces of target image data, acquiring the difference analysis result corresponding to the every two adjacent pieces of first part image data.

In an embodiment, if each difference analysis result satisfies a preset image stability condition, before the processor determines that the target user is at the stable state, the processor 1001 is further configured to perform: determining whether the first difference ratio in each difference analysis result is smaller than or equal to a preset first ratio threshold; if yes, determining whether the second difference ratio in each difference analysis result is smaller than or equal to a preset second ratio threshold; and if the second difference ratio in each difference analysis result is smaller than or equal to the preset second ratio threshold, determining that each difference analysis result satisfies the preset image stability condition.

In an embodiment, when the processor 1001 performs a statistical processing to obtain a total movement times corresponding to the first part image data within a preset statistical time period, the processor 1001 is specifically configured to perform: during a preset second collecting time period, collecting regularly a plurality of second user images corresponding to the target user, and extracting first part image data in each of the plurality of second user images; computing a first part vertical-axis distance corresponding to the first part image data in each of the plurality of second user images to obtain a plurality of first part vertical-axis distances; selecting a maximum first part vertical-axis distance and a minimum first part vertical-axis distance from the plurality of first part vertical-axis distances, and computing an absolute value of a difference between the maximum first part vertical-axis distance and the minimum first part vertical-axis distance, and computing a third difference ratio of the absolute value of the difference to the maximum first part vertical-axis distance; and if the third difference ratio is greater than a preset third ratio threshold, adding one to a movement times corresponding to the first part image data, and detecting a movement times corresponding to the first part image data during a next second collecting time period, so as to perform the statistical processing to obtain the total movement times corresponding to the first part image data within the preset statistical time period, in which the preset statistical time period is longer than the second collecting time period.

Therefore, with embodiments of the present disclosure, during a preset first collecting time period, a plurality of first user images corresponding to a target user may be collected regularly, and first part image data in each of the plurality of first user images may be extracted, position information of the first part image data in each of the plurality of first user images on a display interface may be recorded, and if it is determined that the target user is at a preset stable state according to the position information of the first part image data in each of the plurality of first user images on the display interface, a statistical processing may be performed to obtain a total movement times corresponding to the first part image data within a preset statistical time period; and if the total movement times corresponding to the first part image data reaches a preset threshold, an image processing may be performed on second part image data on a current display interface. With the present disclosure, when the target user is at the stable state, the total movement times corresponding to the first part image data can be counted, and when the total movement times reaches a preset threshold, the image processing can be performed on the second part image data on the display interface. Thus, complex manual operations may be avoided, and it may be unnecessary to display an additional manual control when processing the second part image data, which may enlarge displaying area of the image data, thereby improving the displaying effect of the image data.

Furthermore, it should be noted that, embodiments of the present disclosure also provide a computer storage medium, which has stored therein the above-mentioned application programs including program instructions and executed by the image data processing apparatus 1 that, when the program instructions executed by a processor of a device, cause the processor to perform the image data processing method according to the embodiments corresponding to FIG. 1 or FIG. 4, which will not be described here. In addition, the advantageous effects of the same method will not be described here. With respect to the non-disclosed details of the commuter storage medium embodiments, please refer to the corresponding part of the description of the method embodiments.

Furthermore, it should be noted that, embodiments of the present disclosure also provide a computer program product, when the instructions in the computer program product are executed by a processor, the computer program product is able to execute the image data processing method described in embodiments corresponding to FIG. 1 or FIG. 4, which will not be described here. In addition, the advantageous effects of the same method will not be described here. With respect to the non-disclosed details of the computer program product embodiments, please refer to the corresponding part of the description of the method embodiments.

Terms used in embodiments of the present disclosure are mealy for the purpose of describing specific embodiments, rather than limiting the present disclosure. The single form such as "a", and "the" used in the claims and description may include plural form, unless expressly described otherwise. It also should be understood that the term "and/or" used herein refers to any possible combinations of one or more relative listed items.

With the description of the above implementations, skilled in the art may understand that, for a convenient and simplified description, the above functional module are merely examples, in practical application, the above functions may be distributed to different functional modules. In other words, inner structure of the apparatus may be divided into different functional modules to perform all or a part of the functions. The specific process of the apparatus and units described above may refer to the corresponding process in the method embodiment, which will not be described herein.

In addition, respective functional units in respective embodiments of the present disclosure can be integrated into one processing unit, or can be present as separate physical entities. It is also possible that two or more than two units are integrated into one unit. The integrated units may be implemented in the form of hardware or in the form of software.

The integrated unit, if implemented in the form of a software functional unit and sold or used as an independent product, may be stored in a computer-readable storage medium. Based on such understanding, the technical solutions of the present application essentially, or the part contributing to the prior art, or all or part of the technical solutions may be embodied in the form of a software product. The computer software product is stored in a storage medium, including several instructions for causing a computer device (which may be a personal computer, a server, or a network device, etc.) or a processor to execute all or part of steps of the methods in the embodiments of the present disclosure. The foregoing storage medium includes various media that can store program codes, such as a USB flash drive, a mobile hard disk drive, a read only memory (ROM), a random access memory (RAM), a magnetic disk, an optical disk, etc.

The foregoing is merely the specific implementation manners of the present disclosure. However, the protection scope of the present disclosure is not limited thereto. Anyone skilled in the art may easily conceive, within the technical scope disclosed in the present disclosure, changes and substitutions that should be covered within the scope of protection of the application. Therefore, the protection scope of the present disclosure shall be subject to the protection scope of the claims.

What is claimed is:

1. An image data processing method, comprising:
   during a preset first collecting time period, collecting regularly a plurality of first user images corresponding to a target user, and extracting first part image data in each of the plurality of first user images;
   recording position information of the first part image data in each of the plurality of first user images on a display interface;
   when it is determined that the target user is at a preset stable state according to the position information of the first part image data in each of the plurality of first user images on the display interface, performing a statistical processing to obtain a total movement times corresponding to the first part image data within a preset statistical time period; and
   when the total movement times corresponding to the first part image data reaches a preset threshold, performing an image processing on second part image data on a current display interface,
   wherein, before the statistical processing is performed to obtain the total movement times corresponding to the first part image data within the preset statistical time period, the image data processing method further comprises:
   performing a difference analysis on position information of every two adjacent pieces of first part image data according to the position information of the first part image data in each of the plurality of first user images on the display interface to acquire a difference analysis result corresponding to every two adjacent pieces of first part image data, in which two adjacent pieces of first part image data are collected at two adjacent collecting time points; and
   when each difference analysis result satisfies a preset image stability condition, determining that the target user is at the stable state.

2. The image data processing method according to claim 1, wherein the first part image data comprises image data of a face organ.

3. The image data processing method according to claim 1, wherein performing a difference analysis on position information of every two adjacent pieces of first part image data according to the position information of the first part image data in each of the plurality of first user images on the display interface to acquire a difference analysis result corresponding to every two adjacent pieces of first part image data comprises:
   selecting two adjacent pieces of first part image data from the first part image data in each of the plurality of first user images as two pieces of target image data;
   acquiring first position information and second position information of the two pieces of target image data on the display interface, in which each of the first position information and the second position information includes central position coordinates and a first part horizontal-axis distance;
   computing a central position distance between central position coordinates included in the first position information and central position coordinates included in the second location information, and computing a first difference ratio of the central position distance to the first part horizontal-axis distance included in the first position information;
   computing an absolute value of a difference between the first part horizontal-axis distance included in the first position information and the first part horizontal-axis distance included in the second position information, and computing a second difference ratio of the absolute value of the difference to the first part horizontal-axis distance included in the first position information;
   determining the first difference ratio and the second difference ratio as the difference analysis result corresponding to the two pieces of target image data; and
   acquiring the difference analysis result corresponding to the every two adjacent pieces of first part image data by performing steps of selecting, acquiring, computing, determining and acquiring for every two adjacent pieces of first part image data.

4. The image data processing method according to claim 1, wherein, when each difference analysis result satisfies a preset image stability condition, before determining that the target user is at the stable state, the image data processing method further comprises:

determining whether the first difference ratio in each difference analysis result is smaller than or equal to a preset first ratio threshold;

if yes, determining whether the second difference ratio in each difference analysis result is smaller than or equal to a preset second ratio threshold; and when the second difference ratio in each difference analysis result is smaller than or equal to the preset second ratio threshold, determining that each difference analysis result satisfies the preset image stability condition.

5. The image data processing method according to claim 1, wherein performing a statistical processing to obtain a total movement times corresponding to the first part image data within a preset statistical time period comprises:

during a preset second collecting time period, collecting regularly a plurality of second user images corresponding to the target user, and extracting first part image data in each of the plurality of second user images;

computing a first part vertical-axis distance corresponding to the first part image data in each of the plurality of second user images to obtain a plurality of first part vertical-axis distances;

selecting a maximum first part vertical-axis distance and a minimum first part vertical-axis distance from the plurality of first part vertical-axis distances, computing an absolute value of a difference between the maximum first part vertical-axis distance and the minimum first part vertical-axis distance, and computing a difference ratio of the absolute value of the difference to the minimum first part vertical-axis distance; and when the difference ratio is greater than a preset ratio threshold, adding one to a movement times corresponding to the first part image data, and detecting a movement times corresponding to the first part image data during a next second collecting time period, so as to perform the statistical processing to obtain the total movement times corresponding to the first part image data within the preset statistical time period, in which the preset statistical time period is longer than the second collecting time period.

6. An electronic device, comprising a processor and a memory, wherein the processor is connected to the memory, the memory is configured to store executable program codes; and the processor is configured to invoke the executable program codes, so as to perform the image data processing method comprising:

during a preset first collecting time period, collecting regularly a plurality of first user images corresponding to a target user, and extracting first part image data in each of the plurality of first user images;

recording position information of the first part image data in each of the plurality of first user images on a display interface;

when it is determined that the target user is at a preset stable state according to the position information of the first part image data in each of the plurality of first user images on the display interface, performing a statistical processing to obtain a total movement times corresponding to the first part image data within a preset statistical time period; and when the total movement times corresponding to the first part image data reaches a preset threshold, performing an image processing on second part image data on a current display interface, wherein, before the statistical processing is performed to obtain the total movement times corresponding to the first part image data within the preset statistical time period, the image data processing method further comprises:

performing a difference analysis on position information of every two adjacent pieces of first part image data according to the position information of the first part image data in each of the plurality of first user images on the display interface to acquire a difference analysis result corresponding to every two adjacent pieces of first part image data, in which two adjacent pieces of first part image data are collected at two adjacent collecting time points; and when each difference analysis result satisfies a preset image stability condition, determining that the target user is at the stable state.

7. The electronic device according to claim 6, wherein the first part image data comprises image data of a face organ.

8. The electronic device according to claim 6, wherein performing a difference analysis on position information of every two adjacent pieces of first part image data according to the position information of the first part image data in each of the plurality of first user images on the display interface to acquire a difference analysis result corresponding to every two adjacent pieces of first part image data comprises:

selecting two adjacent pieces of first part image data from the first part image data in each of the plurality of first user images as two pieces of target image data;

acquiring first position information and second position information of the two pieces of target image data on the display interface, in which each of the first position information and the second position information includes central position coordinates and a first part horizontal-axis distance;

computing a central position distance between central position coordinates included in the first position information and central position coordinates included in the second location information, and computing a first difference ratio of the central position distance to the first part horizontal-axis distance included in the first position information;

computing an absolute value of a difference between the first part horizontal-axis distance included in the first position information and the first part horizontal-axis distance included in the second position information, and computing a second difference ratio of the absolute value of the difference to the first part horizontal-axis distance included in the first position information;

determining the first difference ratio and the second difference ratio as the difference analysis result corresponding to the two pieces of target image data; and acquiring the difference analysis result corresponding to the every two adjacent pieces of first part image data by performing steps of selecting, acquiring, computing, determining and acquiring for every two adjacent pieces of first part image data.

9. The electronic device according to claim 6, wherein, when each difference analysis result satisfies a preset image stability condition, before determining that the target user is at the stable state, the image data processing method further comprises:

determining whether the first difference ratio in each difference analysis result is smaller than or equal to a preset first ratio threshold;

if yes, determining whether the second difference ratio in each difference analysis result is smaller than or equal to a preset second ratio threshold; and when the second difference ratio in each difference analysis result is smaller than or equal to the preset second ratio threshold, determining that each difference analysis result satisfies the preset image stability condition.

10. The electronic device according to claim 6, wherein performing a statistical processing to obtain a total movement times corresponding to the first part image data within a preset statistical time period comprises:

during a preset second collecting time period, collecting regularly a plurality of second user images corresponding to the target user, and extracting first part image data in each of the plurality of second user images;

computing a first part vertical-axis distance corresponding to the first part image data in each of the plurality of second user images to obtain a plurality of first part vertical-axis distances;

selecting a maximum first part vertical-axis distance and a minimum first part vertical-axis distance from the plurality of first part vertical-axis distances, computing an absolute value of a difference between the maximum first part vertical-axis distance and the minimum first part vertical-axis distance, and computing a difference ratio of the absolute value of the difference to the minimum first part vertical-axis distance; and when the difference ratio is greater than a preset ratio threshold, adding one to a movement times corresponding to the first part image data, and detecting a movement times corresponding to the first part image data during a next second collecting time period, so as to perform the statistical processing to obtain the total movement times corresponding to the first part image data within the preset statistical time period, in which the preset statistical time period is longer than the second collecting time period.

11. A computer storage medium having stored therein a computer program including instructions that, when executed by a processor of a device, cause the processor to perform the image data processing method comprising:

during a preset first collecting time period, collecting regularly a plurality of first user images corresponding to a target user, and extracting first part image data in each of the plurality of first user images;

recording position information of the first part image data in each of the plurality of first user images on a display interface;

when it is determined that the target user is at a preset stable state according to the position information of the first part image data in each of the plurality of first user images on the display interface, performing a statistical processing to obtain a total movement times corresponding to the first part image data within a preset statistical time period; and when the total movement times corresponding to the first part image data reaches a preset threshold, performing an image processing on second part image data on a current display interface, wherein, before the statistical processing is performed to obtain the total movement times corresponding to the first part image data within the preset statistical time period, the image data processing method further comprises:

performing a difference analysis on position information of every two adjacent pieces of first part image data according to the position information of the first part image data in each of the plurality of first user images on the display interface to acquire a difference analysis result corresponding to every two adjacent pieces of first part image data, in which two adjacent pieces of first part image data are collected at two adjacent collecting time points; and when each difference analysis result satisfies a preset image stability condition, determining that the target user is at the stable state.

12. The computer storage medium according to claim 11, wherein the first part image data comprises image data of a face organ.

13. The computer storage medium according to claim 11, wherein performing a difference analysis on position information of every two adjacent pieces of first part image data according to the position information of the first part image data in each of the plurality of first user images on the display interface to acquire a difference analysis result corresponding to every two adjacent pieces of first part image data comprises:

selecting two adjacent pieces of first part image data from the first part image data in each of the plurality of first user images as two pieces of target image data;

acquiring first position information and second position information of the two pieces of target image data on the display interface, in which each of the first position information and the second position information includes central position coordinates and a first part horizontal-axis distance;

computing a central position distance between central position coordinates included in the first position information and central position coordinates included in the second location information, and computing a first difference ratio of the central position distance to the first part horizontal-axis distance included in the first position information;

computing an absolute value of a difference between the first part horizontal-axis distance included in the first position information and the first part horizontal-axis distance included in the second position information, and computing a second difference ratio of the absolute value of the difference to the first part horizontal-axis distance included in the first position information;

determining the first difference ratio and the second difference ratio as the difference analysis result corresponding to the two pieces of target image data; and acquiring the difference analysis result corresponding to the every two adjacent pieces of first part image data by performing steps of selecting, acquiring, computing, determining and acquiring for every two adjacent pieces of first part image data.

14. The computer storage medium according to claim 11, wherein, when each difference analysis result satisfies a preset image stability condition, before determining that the target user is at the stable state, the image data processing method further comprises:

determining whether the first difference ratio in each difference analysis result is smaller than or equal to a preset first ratio threshold;

if yes, determining whether the second difference ratio in each difference analysis result is smaller than or equal to a preset second ratio threshold; and when the second difference ratio in each difference analysis result is smaller than or equal to the preset second ratio threshold, determining that each difference analysis result satisfies the preset image stability condition.

15. The computer storage medium according to claim 11, wherein performing a statistical processing to obtain a total movement times corresponding to the first part image data within a preset statistical time period comprises:
- during a preset second collecting time period, collecting regularly a plurality of second user images corresponding to the target user, and extracting first part image data in each of the plurality of second user images;
- computing a first part vertical-axis distance corresponding to the first part image data in each of the plurality of second user images to obtain a plurality of first part vertical-axis distances;
- selecting a maximum first part vertical-axis distance and a minimum first part vertical-axis distance from the plurality of first part vertical-axis distances, computing an absolute value of a difference between the maximum first part vertical-axis distance and the minimum first part vertical-axis distance, and computing a difference ratio of the absolute value of the difference to the minimum first part vertical-axis distance; and
- when the difference ratio is greater than a preset ratio threshold, adding one to a movement times corresponding to the first part image data, and detecting a movement times corresponding to the first part image data during a next second collecting time period, so as to perform the statistical processing to obtain the total movement times corresponding to the first part image data within the preset statistical time period, in which the preset statistical time period is longer than the second collecting time period.

* * * * *